May 14, 1935.  B. MANROSS  2,000,972
REVIVIFIER
Original Filed Nov. 4, 1930

Inventor
Bert Manross
By Clarence A. O'Brien
Attorney

Patented May 14, 1935

2,000,972

UNITED STATES PATENT OFFICE 2,000,972

REVIVIFIER

Bert Manross, Warren, Pa.

Original application November 4, 1930, Serial No. 493,457. Divided and this application January 23, 1933, Serial No. 653,147

13 Claims. (Cl. 263—26)

This is a divisional application containing matter divided out of my pending application Serial No. 493,457, filed November 4, 1930.

This invention relates generally to driers, and particularly to that type of drier which is suitable for the drying steps in commercial fuller's earth treating and producing processes, and similar processes, and an important object of my invention is to provide a fuller's earth revivifying apparatus having means incorporated therein for recovering particles of fuller's earth or the like which may be carried from the drier furnace with the products of combustion, and which are ordinarily discharged through the stack of the revivifier furnace and lost.

It is also an important object of my invention to provide a revivifier of the class described having means interpolated between the furnace and the furnace stack for arresting and collecting particles of fuller's earth and the like which may be carried by the products of combustion and which would ordinarily escape with them into the stack, said means having the further effect of reducing the draft at the top of the furnace so as to reduce unwanted flashing or burning of portions of the fuller's earth which enter the furnace subsequent to treatment for decarbonization. This feature is important in any process of furnace drying fuller's earth or the like subsequent to the usual cleaning process for decarbonizing it.

It is also an important object of my invention to provide in a revivifier of the class described, means for returning the fuller's earth which is collected from the products of combustion, to the furnace on a plane below that at which the products of combustion escape therefrom laden with fuller's earth so that recirculation to the stock of the returned separated particles is positively prevented.

It is also an important object of my invention to provide valved means operable by a sufficient accumulation of fuller's earth or the like particles and arranged so that the accumulated or collected fuller's earth particles may gravitate to the said lower level of the furnace.

It is also an important object of my invention to provide in a drier of the class described above, dead air space means into which the products of combustion are directed whereby a separation of the heavier fuller's earth particles or the like thereby from the lighter products of combustion is effected, and the said lighter products of combustion permitted to escape.

Other objects and advantages of my invention will be apparent from a reading of the following description in connection with the drawing, wherein for purposes of illustration I have shown a preferred embodiment of my invention.

In the drawing:—

Figures 1, 2:
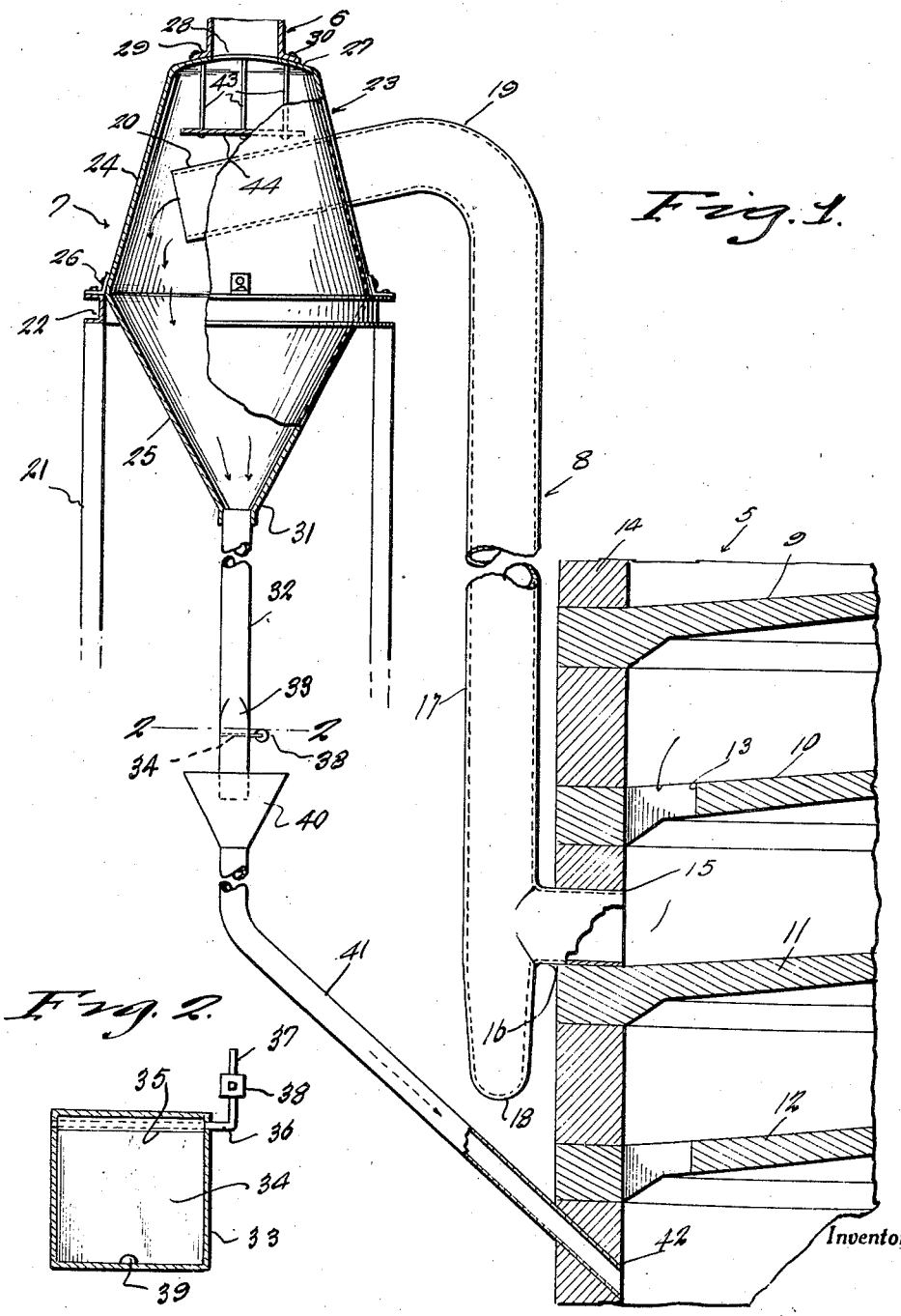
Figure 1 is a general vertical sectional view through an embodiment of my invention.
Fig. 2 is a horizontal sectional view taken approximately on the line 2—2 of Fig. 1 and looking downwardly.

Referring in detail to the drawing, wherein like numerals refer to like parts throughout the same, the device of the invention comprises the revivifier furnace per se 5, the furnace stack 6, the separator element 7, and the conduit 8 connecting the furnace and the separator, which are connected so that the furnace communicates with the separator, the separator with the conduit, and the conduit with the furnace.

Since any conventional suitable form of revivifier furnace 5 is adequate for embodying the invention such as the Nichols-Herreshoff type or the type shown and described in Patent No. 1,671,395 granted May 29, 1928, or that shown in the patent granted to C. K. Parker et al. on May 19, 1931, Patent No. 1,806,020, only a portion of the furnace 5 has been illustrated. A suitable furnace comprises a series of vertically spaced floors or partitions, each having an opening 13 at one side and communicating with the space defined by it and the next floor below. One side wall of the furnace 5 is provided with an opening 15 at a point below its upper end and immediately above a partition 11 which is devoid of a side opening into which opening 15 is closely fitted a horizontal portion 16 of the stack 8. The partition 11 divides the furnace into upper and lower sections and has only a central opening through which material in the furnace may pass below the partition 11. The stack portion 16 is connected to and in communication with the vertical stack portion 17 at a point above its lower end 18 which is closed as indicated. On the upper end of the vertical portion 17 is a gooseneck air-trapping portion 19 which has the angularly depressed end portion 20 passed through one side of the separator 7.

The separator 7 comprises a suitable stand 21 supporting an annular ring 22 on its upper end for supporting the separator casing generally designated 23.

The separator casing 23 comprises an upper truncated conical hollow portion 24 and a lower inverted conical portion 25, which is also hollow.

The ring 22 surrounds the separator casing 23 at the point where the upper part 24 joins the lower part 25 and is connected to the casing by means of lateral brackets 26 preferably fastened to the lower end portion of the top portion 24 as shown in the drawing.

The comparatively flat dome-shaped top 27 of the upper casing portion 24 has a centralized opening 28 therein which is surrounded by and in communication with the lower end of the stack 6, which has a lateral flange 29 resting on the top 27 and secured thereto by suitable means 29 and 30.

The lower end or apex of the inverted conical lower casing portion 25 is provided with an opening 31 into which is received the upper end of a generally cylindrical conduit 32 which has at its lower end a squared portion 33 in which is rather closely fitted a swinging gate valve 34 which is mounted as indicated at 35 upon a shaft 36 having a laterally directed portion 37 outward of the squared portion 33 and provided with a longitudinally adjustable weight 38 for counterbalancing a predetermined amount of fuller's earth particles accumulated in the lower part 25 of the casing and in the conduit 32 upon the valve 34. One side of the squared portion 33 is provided with a lug 39 with which the upper side of the gate valve 34 is arranged to engage in the closed position, so that the gate valve 34 when swung upwardly toward closed position by the weight 38 in the absence of an accumulation of fuller's earth particles thereon, will not swing beyond the horizontal closed position, but will be capable only of swinging downwardly to an open position upon the accumulation thereon of fuller's earth particles or the like of greater mass than the weight 38 as suggested. The gate valve 34 when closed is of sufficiently tight fit in the squared portion 33 to create a dead air space in the upper part of the conduit 32 and in the lower casing part 25.

The lower end of the conduit 32 empties into a hopper 40 located thereunder in receiving relation thereto. The hopper 40 has leading from the lower end thereof a declining return conduit 41 capable of gravitationally conveying fuller's earth particles or the like deposited therein to a point below the hopper 40, in this case, to a portion of the lower section of the furnace 5 below the partition 11 whereby rising of the returned particles into the stack is prevented by the interposition of the partition 11.

The depressed upper end portion 20 of the stack 8, which passes through one side of the wall of the upper casing portion 24, has its open end located close to the diametrically opposite side of the casing portion 24 and at such an angle thereto that the particle-laden products of combustion are flowed against the downwardly flaring walls of the upper casing portion 24 without danger of fracturing or pulverizing the particles by impact with said walls, whereby to direct the laden products of combustion downwardly as indicated by the arrows in Fig. 1 into the lower casing portion 25. Passage of air downwardly beyond the valve 34 being prevented either by the closed position of the valve 34 or by an accumulation of fuller's earth particles or the like in the conduit 32 will produce a dead air space in the lower casing portion 25 into which the laden products of combustion are directed. Because of the greater weight of the fuller's earth or the like particles entrained in the products of combustion, the particles of fuller's earth or the like will separate gravitationally from the lighter products of combustion and fall into the dead air space and collect and accumulate in the lower casing portion 25 and in the conduit 32 above the valve 34, and fail to rise with the lighter products of combustion and escape through the opening in the top of the upper casing portion 24 into the stack 6 for discharge to the atmosphere. Both the lighter and the heavier of the fuller's earth particles collect in this way for return to the furnace for further conditioning, and the heavier particles aid in preventing the lighter particles from packing too tightly and in securing gravitational movement of the lighter particles.

Vertical rods 43 depend from the casing top 27 and surround the opening 28 therein and carry at their lower ends a horizontal baffle 44 which is located immediately above the depressed end 20 of the stack gooseneck. The baffle plate 44 is of such a diameter and in such relation to the stack that it impedes too rapid passage of air and the lighter products of combustion to the stack, whereby the velocity of escape of the products of combustion from the furnace through the stack 8 will be reduced so as to prevent excessive draft in the drier furnace. Not only does this reduction of and control of draft in the furnace favor proper conditions within the furnace and prevent flashing of the decarbonized fuller's earth in the upper section of the furnace, but it and the bend 19 in the stack sufficiently reduces the velocity of the laden products of combustion coming into the separator casing 23 that the particles flow rather than hit against the side of the separator casing and to insure that a proper separating action of the fuller's earth or the like particles will take place, and that only an inconsiderable amount of the particles will be fractured or pulverized and/or fail of being separated within the separator and be carried out of the opening 28 into the stack 6. The open end 20 of the stack portion 19 is located considerably below and to one side of the discharge opening 28 in the top of the separator casing so that the particle-laden products of combustion will be carried well outside of and below the zone of influence of the escaping lighter products of combustion as they rise about the baffle plate 44 and escape into the stack 6, even though the stack 5 enters the upper part of the separator casing.

The stack 8 is of such height and cross section that by virtue of its connection to the upper section of the furnace and the rising of the products of combustion therein, the stack will be sufficiently heated to preclude the formation of condensation therein. The importance of obviating condensation in the stack will be understood when it is considered that moisture caused by condensation would be carried over into the separator casing and cause the separated particles to pack and sludge to such an extent that the accumulated particles could not pass out of the separator casing under their own weight and would have to be shovelled out. The separator casing is so arranged and constructed that the dry highly heated products of combustion entering the separator casing by the gooseneck 19 sufficiently heat the interior of the casing and the baffle 44 so that the condensation is prevented within the separator casing and gooseneck. It will be obvious that it is equally if not more important that the interior of the separator casing be kept hot and free of moisture so that a proper separation of the particles will take place and to ensure that the separated and collected particles will remain separated and in a free flowing dry condition. If the particles as they come into the separator casing are wet they cannot be properly separated but will simply fall to the bottom of the casing and form a sludge which will plug the conduits 32 and 41 and render the apparatus partly or completely inoperative until cleaned out at great expense and loss of operating time. I understand that an inefficient condition of this kind is one of the greatest objections to presently used devices of this kind. My apparatus, however, is not subject to these objections, but maintains a highly efficient operating condition over an indefinitely long period of time and recovers and enables the reconditioning and reuse of a larger percentage of the decarbonized fuller's earth than has heretofore been possible.

The importance of providing in my invention the means described whereby fracture and pulverization of the fuller's earth particles is avoided will be understood when it is realized that in order to be useful for oil refining purposes the fuller's earth particles must retain their original porous, absorptive, cellular character through any process of reconditioning or rejuvenating thereof, and that the particles will be wholly useless for these purposes if fractured or pulverized during or as a result of the process. Since it can be shown that my apparatus enables the reburning or rejuvenating of decarbonized fuller's earth used for oil refining purposes on an average of thirty-two (32) times as against an average of eight (8) times possible with other apparatus, before the fuller's earth becomes unfit for this use, the superiority of my apparatus is clearly established, especially since my apparatus enables the recovery and reuse of a large percentage of the fuller's earth now being lost in the best available apparatus.

Reference made herein to prevention of flashing of the decarbonized fuller's earth as it enters the upper section of the furnace is further explained by stating that in conventional fuller's earth rejuvenating processes as in the present invention, the fuller's earth is treated with decarbonizing material to remove the hydrocarbon and other sludge absorbed by the fuller's earth during its use in the oil refining operations. At the termination of the decarbonizing there remains in the fuller's earth a certain amount of the readily inflammable decarbonizing material. When this fuller's earth is introduced into ordinary furnaces, it quickly ignites and flashes with sufficient of an explosion to cause a heavy upward draft through the stack of the furnace which, being unimpeded, encourages a continuance of the ignition which impairs the fuller's earth. In my apparatus, when such flashing of the decarbonized fuller's earth commences, the uprush of pressure through the stack 8 is met by a cushion of air trapped in the upper part of the stack and in the separator casing by virtue of the construction already described, which checks the unusual updraft in the stack and damps the flashing in a manner unfavorable of a continuance thereof. This automatic checking of flashing in the upper section of the furnace not only very advantageously controls and imparts regularity to the draft through the apparatus, but prevents impairment of considerable portions of the charge in the furnace and ensures a more uniform final product of higher grade.

It will be observed that no artificial or forced draft assistance is given the natural draft which takes the fuller's earth out of the upper section of the furnace, passes it through the separator, and permits it to return to the lower section of the furnace, and that the entire circulation is achieved and maintained by natural circulation and the force of gravity, a circumstance which makes my very efficient apparatus cheaper to operate and maintain than any other similar device known to me.

Although I have shown and described herein a preferred embodiment of the invention, it is to be definitely understood that I do not care to limit the application of the invention thereto, and any change or changes may be made in material and construction and arrangement of parts, within the spirit of the invention and the scope of the subjoined claims.

Having thus described my invention, what I claim as new is:—

1. The combination with a multiple hearth rejuvenating furnace some of the hearths being devoid of openings at their sides but provided with a central opening and others of the hearths being provided with openings at their sides but devoid of an opening at the center thereof, a stack communicating with the interior of the furnace at a point below a side opening equipped upper hearth and above a center opening equipped hearth, and arranged to provide for escape thereinto of gaseous products of combustion containing solid particles, a return conduit leading into a lower hearth below a lower hearth equipped with a side opening, and solid particle separating means interposed between and connecting said stack and said return conduit and operating to separate said solid particles from said gaseous products of combustion while permitting the latter to escape, and return the separated particles to said lower hearth of the furnace for additional rejuvenating in said furnace, the hearths interposed between said upper and lower hearths preventing rising of the returned separated solid particles into said stack.

2. The combination with a rejuvenating furnace having a plurality of vertically spaced hearths alternating ones of the hearths having side openings and center openings, a stack communicating with the interior of the furnace below one of the upper side opening equipped hearths and above the next below center opening equipped hearth in a manner to provide for escape into the stack of gaseous products of combustion containing solid particles, a particle returning conduit communicating with the interior of the furnace below a lower one of the side opening equipped hearths and above the next below center opening equipped hearth, solid particle separating means interposed between and connecting said stack and said particle returning conduit and operating to separate said solid particles from said gaseous products of combustion while permitting the latter to escape into the atmosphere, and return the separated particles through said conduit to the furnace for additional rejuvenating in said furnace, the hearths intervening between the said upper and lower hearths preventing rising of the returned separated solid particles into said stack, said stack being arranged so that said products of combustion enter the same from the furnace and rise therein naturally and without artificial draft creating means, and said return conduit being arranged to receive and return said separated solid particles to the lower section of the furnace by gravity alone, and normally closed valve means in a portion of said particle returning conduit arranged to be opened by the weight of separated solid particles thereon.

3. The combination with a rejuvenating furnace having a plurality of vertically spaced hearths alternating ones of the hearths having side openings and center openings, a stack communicating with the interior of the furnace below one of the upper side opening equipped hearths and above the next below center opening equipped hearth in a manner to provide for escape into the stack of gaseous products of combustion containing solid particles, a particle returning conduit communicating with the interior of the furnace below a lower one of the side opening equipped hearths and above the next below center opening equipped hearth, solid particle separating means interposed between and connecting said stack and said particle returning conduit and operating to separate said solid particles from said gaseous products of combustion while permitting the latter to escape into the atmosphere, and return the separated particles through said conduit to the furnace for additional rejuvenating in said furnace, the hearths intervening between the said upper and lower hearths preventing rising of the returned separated solid particles into said stack, said stack being arranged and proportioned to be sufficiently heated by its connection with the furnace and the rising of said gaseous products of combustion therein whereby the formation of condensation therein and in the solid particle separating means is prevented and gravitational separation and collection of said solid particles in said separating means in condition suitable for gravitational return to said lower section of the furnace for further rejuvenation is assured.

4. The combination with a rejuvenating furnace having a plurality of vertically spaced hearths alternating ones of the hearths having side openings and center openings, a stack communicating with the interior of the furnace below one of the upper side opening equipped hearths and above the next below center opening equipped hearth in a manner to provide for escape into the stack of gaseous products of combustion containing solid particles, a particle returning conduit communicating with the interior of the furnace below a lower one of the side opening equipped hearths and above the next below center opening equipped hearth, solid particle separating means interposed between and connecting said stack and said particle returning conduit and operating to separate said solid particles from said gaseous products of combustion while permitting the latter to escape into the atmosphere, and return the separated particles through said conduit to the furnace for additional rejuvenating in said furnace, the hearths intervening between the said upper and lower hearths preventing rising of the returned separated solid particles into said stack, said return conduit being arranged to be heated by its connection with the furnace and by the rising therein of hot products of combustion from the furnace therein whereby the formation of condensation in said return conduit is prevented and the gravitational return of the separated and collected particles through said return conduit to the furnace is assured.

5. The combination with a rejuvenating furnace having a plurality of vertically spaced hearths alternating ones of the hearths having side openings and center openings, a stack communicating with the interior of the furnace below one of the upper side opening equipped hearths and above the next below center opening equipped hearth in a manner to provide for escape into the stack of gaseous products of combustion containing solid particles, a particle returning conduit communicating with the interior of the furnace below a lower one of the side opening equipped hearths and above the next below center opening equipped hearth, solid particle separating means interposed between and connecting said stack and said particle returning conduit and operating to separate said solid particles from said gaseous products of combustion while permitting the latter to escape into the atmosphere, and return the separated particles through said conduit to the furnace for additional rejuvenating in said furnace, the hearths intervening between the said upper and lower hearths preventing rising of the returned separated solid particles into said stack, said stack being arranged so that said products of combustion enter the same from the furnace and rise therein naturally and without artificial draft creating means, and said return conduit being arranged to receive and return said separated solid particles to the furnace by gravity alone, said return conduit being arranged to be heated by its connection with the furnace and by the rising therein of hot products of combustion from the furnace therein whereby the formation of condensation in said return conduit is prevented and the gravitational return of the separated and collected particles through said return conduit to said furnace is assured.

6. The combination with a rejuvenating furnace having a plurality of vertically spaced hearths alternating ones of the hearths having side openings and center openings, a stack communicating with the interior of the furnace below one of the upper side opening equipped hearths and above the next below center opening equipped hearth in a manner to provide for escape into the stack of gaseous products of combustion containing solid particles, a particle returning conduit communicating with the interior of the furnace below a lower one of the side opening equipped hearths and above the next below center opening equipped hearth, solid particle separating means interposed between and connecting said stack and said particle returning conduit and operating to separate said solid particles from said gaseous products of combustion while permitting the latter to escape into the atmosphere, and return the separated particles through said conduit to the furnace for additional rejuvenating in said furnace, the hearths intervening between the said upper and lower hearths preventing rising of the returned separated solid particles into said stack, said stack being arranged so that said products of combustion enter the same from the upper part of the furnace and rise therein naturally and without artificial draft creating means, and said return conduit being arranged to receive and return said separated solid particles to the lower part of the furnace by gravity alone, said stack and said separating means establishing an air cushion for smothering flashing of the combustible material in the upper part of the furnace.

7. In a fuller's earth revivifying apparatus including a particle separating and collecting device, and a multiple hearth revivifying furnace, a stack communicating with the interior of the furnace between two adjacent upper ones of the hearths of the furnace and with said device, a separated particle returning conduit leading from said device and communicating with the interior of the furnace at a point between two adjacent lower ones of the hearths.

8. In a fuller's earth revivifying apparatus including a particle separating and collecting device having a gravitational particle returning conduit, and a multiple hearth revivifying furnace having a stack communicating with said device and with an upper part of the interior of the furnace, said stack communicating with the space between two adjacent ones of the upper hearths and said conduit communicating with the space between two adjacent ones of the hearths in a lower part of the furnace, whereby hearths intervening between the mentioned upper and lower hearths prevent rising of the return particles into the stack.

9. In a fuller's earth revivifying apparatus including a particle separating and collecting device having a gravitational particle returning conduit, and a multiple hearth revivifying furnace having a stack communicating with said device and with an upper part of the interior of the furnace, said stack communicating with the space between two adjacent ones of the upper hearths and said conduit communicating with the space between two adjacent ones of the hearths in a lower part of the furnace, whereby hearths intervening between the mentioned upper and lower hearths prevent rising of the return particles into the stack, alternate ones of said hearths being provided with side openings only or with center openings, respectively, the stack opening being located below one of the side opening equipped hearths and said conduit entering the furnace below one of the side openings equipped hearths.

10. In a fuller's earth revivifying apparatus including a particle separating and collecting device having a gravitational particle returning conduit, and a multiple hearth revivifying furnace having a stack communicating with said device and with an upper part of the interior of the furnace, said stack communicating with the space between two adjacent ones of the upper hearths and said conduit communicating with the space between two adjacent ones of the hearths in a lower part of the furnace, whereby hearths intervening between the mentioned upper and lower hearths prevent rising of the return particles into the stack, alternate ones of said hearths being provided with side openings only or with center openings, respectively, the stack opening being located below one of the side opening equipped hearths and said conduit entering the furnace below one of the side opening equipped hearths, each of said hearths having agitating arms sweeping the upper side thereof for the purpose of moving the material deposited thereon to the next lower hearth through the respective side and center openings thereof, the material thus moved and falling through the side opening in the hearth immediately above the point of entrance of the particle returning conduit acting to carry the particles returned to the furnace in a downward direction, thereby further preventing rising of the returned particles after return to the furnace.

11. In a fuller's earth revivifying apparatus including a particle separating and collecting device, and a multiple hearth revivifying furnace, a stack communicating with the interior of the furnace between two adjacent upper ones of the hearths of the furnace and with said device, a separated particle returning conduit leading from said device and communicating with the interior of the furnace at a point between two adjacent lower ones of the hearths, said device containing a dead-air space into which the particles entrained in the products of combustion issuing from the stack impinge, said device further containing a baffled product of combustion discharge, said baffled discharge and said dead-air space being arranged so as to prevent excess draft through the device and to act as cushioning agents to damp explosive combustion taking place in the furnace by arresting sudden movement of the products of combustion through the stack.

12. In a fuller's earth revivifying apparatus including a particle separating and collecting device, and a multiple hearth revivifying furnace, a stack communicating with the interior of the furnace between two adjacent upper ones of the hearths of the furnace and with said device, a separated particle returning conduit leading from said device and communicating with the interior of the furnace at a point between two adjacent lower ones of the hearths, said stack and said device being arranged with respect to each other and with respect to the furnace so that the products of combustion containing the particles to be separated and collected are passed therethrough by natural draft without the assistance of artificial draft creating means.

13. In a fuller's earth revivifying apparatus including a particle separating and collecting device, and a multiple hearth revivifying furnace, a stack communicating with the interior of the furnace between two adjacent upper ones of the hearths of the furnace and with said device, a separated particle returning conduit leading from said device and communicating with the interior of the furnace at a point between two adjacent lower ones of the hearth, said stack being arranged with respect to the furnace and said device with respect to the stack so that the hot products of combustion containing the hot particles to be separated and collected passing through the stack and through said device will maintain a sufficiently high temperature to preclude the formation of condensation in the interior of said stack and in the interior of said device.

BERT MANROSS.